United States Patent [19]

Aya et al.

[11] 4,340,697
[45] Jul. 20, 1982

[54] HEAT RESISTANT MOLDING RESIN COMPOSITION

[75] Inventors: Toshihiko Aya; Yasushi Kubo, both of Nagoya, Japan

[73] Assignee: Toray Industries, Inc., Tokyo, Japan

[21] Appl. No.: 189,841

[22] PCT Filed: Aug. 2, 1979

[86] PCT No.: PCT/JP79/00204

§ 371 Date: Apr. 1, 1980

§ 102(e) Date: Apr. 1, 1980

[87] PCT Pub. No.: WO80/00349

PCT Pub. Date: Mar. 6, 1980

[51] Int. Cl.³ .................. C08L 81/04; C08L 79/08
[52] U.S. Cl. ..................... 525/420; 525/397; 525/423; 525/425; 525/432; 525/436; 525/537; 525/905; 525/906; 525/930; 525/928
[58] Field of Search ........................ 525/420, 537

[56] References Cited

U.S. PATENT DOCUMENTS

| | | | |
|---|---|---|---|
| 4,017,555 | 4/1977 | Alvarez | 260/857 PA |
| 4,132,823 | 1/1979 | Blackwell | 428/215 |
| 4,292,416 | 9/1981 | Shue | 525/420 |

FOREIGN PATENT DOCUMENTS

| | | |
|---|---|---|
| 80349 | 3/1980 | European Pat. Off. |
| 53-69255 | 6/1978 | Japan . |
| 55-45704 | 3/1980 | Japan . |
| 55-135160 | 10/1980 | Japan . |
| 2039931 | 8/1980 | United Kingdom . |

OTHER PUBLICATIONS

Journal of Polymer Science, vol. 12, 589-601, (1974).

*Primary Examiner*—Paul Lieberman
*Attorney, Agent, or Firm*—Austin R. Miller

[57] ABSTRACT

The present invention relates to a heat resistant molding resin composition comprising 60-99.9% by weight of an aromatic polyamideimide resin, and 40-0.1% by weight of a thermoplastic resin which comprises at least one member selected from the group consisting of a polyphenylene sulfide resin, a polyamide resin, a polysulfone resin, an aromatic polyester resin, a polyphenyleneether resin and a phenoxy resin. The thermoplastic resin must have a melt viscosity at 350° C. of not more than $1 \times 10^5$ poise and a decomposition temperature of not lower than 350° C. The aromatic polyamideimide resin is improved in melt viscosity characteristics by being blended with the thermoplastic resin. Therefore, a resin composition is obtained which is excellent in moldability characteristics. This composition may optionally comprise various kinds of fillers. Shaped articles, obtained by melt molding of the compositions in accordance with the present invention, are excellent in heat resistance, mechanical characteristics, electrical characteristics, sliding characteristics and solvent resistance characteristics and may be utilized in many different ways.

4 Claims, No Drawings

HEAT RESISTANT MOLDING RESIN COMPOSITION

The present invention relates to a heat resistant molding resin composition which is excellent in heat resistant properties. In more detail, the present invention relates to a polyamideimide resin composition which is excellent in balancing of melt viscosity characteristics and mechanical characteristics.

DISCUSSION OF THE PRIOR ART

Polyimide resins, represented by the trademarks "VESPEL SP" of DuPont in the United States and "POLYIMIDE 2080" of Upjohn in the United States, are very excellent in heat resistance, mechanical strength, chemical resistance and electrical characteristics, but they lack melt processability and cannot be melt molded. In order to improve this defect, it has been proposed that better melt moldability may be imparted to a polyimide, for example, "POLYIMIDE 2080" mentioned above, by blending it with 30 to 50% by weight of polyphenylene sulfide (U.S. Pat. No. 4,017,555). However, as the polyimide resin itself is deficient in melt processability, a relatively large amount of the polyphenylene sulfide resin is necessary in the blend for imparting an acceptable melt processability to the polyimide. Therefore, the thus obtained melt moldable composition exhibits poor mechanical properties in comparison with the inherent properties of the polyimide itself.

The aromatic polyamideimide resin represented by the trademark "TORLON" of Amoco in the United States, has both a polyimide linkage and a polyamide linkage in the high polymer main chain. Therefore, it can be tentatively melt molded, and at the same time it has excellent heat resistance, mechanical strength, chemical resistance and electrical characteristics, similar to those of a polyimide resin. Therefore, the polyamideimide resins can supply high-performance industrial material parts via high productivity molding methods, and have been attracting attention in various fields.

However, aromatic polyamideimide resins have a considerably high melt viscosity in comparison with conventionally utilized thermoplastic molding materials, and they are melt blended and melt molded only with considerable difficulty. When one attempts to obtain a shaped article therefrom by use of injection molding machines, the process must be practiced under strict conditions, such as a mold temperature of at least 200° C., an injection pressure of 1,000–2,000 kg/cm², as well as other strictly controlled conditions held within a very narrow range (for example, residence time of the resin, resin temperature, screw shape and mold structure). Thus, the melt characteristics and other properties of polyamideimide still remain unsatisfactory for obtaining a sufficient molding productivity. Furthermore, when fillers are blended with an aromatic polyamideimide resin, the melt viscosity further rises in proportion to the increase of their blending amounts, and at blending amounts higher than a certain value, it becomes difficult to or impossible to melt blend and melt mold the composition.

Therefore, we, the present inventors, have conducted strenuous studies aimed at improving the melt viscosity and uniform melt blendability of aromatic polyamideimide resin or its composite, including fillers. We have found that by blending a certain kind of thermoplastic resin in a specific amount range, a composition having well balanced and excellent melt viscosity characteristics, melt moldability, and mechanical properties, can be obtained and realized by the present invention.

SUMMARY OF THE INVENTION

The present invention comprises a heat resistant molding resin having 60 to 99.9% by weight of:

(a) an aromatic polyamideimide resin having, as a main structural unit, a repeating unit represented by the general formula:

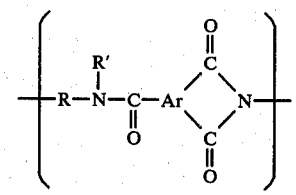

(wherein Ar represents a trivalent aromatic group containing at least one aromatic ring, R represents a divalent aromatic and/or aliphatic residue and R' represents hydrogen, a methyl group or a phenyl group), and 40 to 0.1% by weight of:

(b) at least one thermoplastic resin selected from the group consisting of a polyphenylene sulfide resin, a polyamide resin, a polysulfone resin, an aromatic polyester resin, a polyphenyleneether resin and a phenoxy resin, said thermoplastic resin having a melt viscosity of not more than $1 \times 10^5$ (preferably $5 \times 10^4$) poise measured at 350° C. and a decomposition temperature of higher than 350° C.

The composition of the present invention may also contain not more than 250 parts of filler, based on 100 parts of the total amount of the resin components.

DETAILED DESCRIPTION OF THE INVENTION

The aromatic polyamideimide resin, in accordance with the present invention, has a repeating unit represented by the general formula:

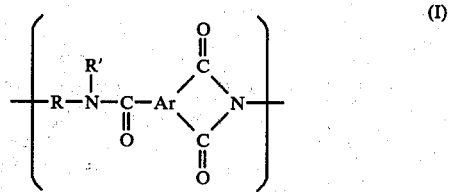

(I)

as a main structural unit and may have not more than 50 mol %, preferably not more than 30 mol %, of another bonding unit, for example, a polyamide and/or a polyimide unit represented by the following general formulae (II) or (III):

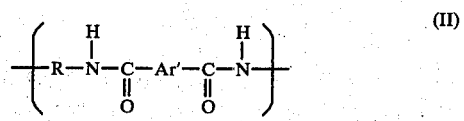

(II)

-continued

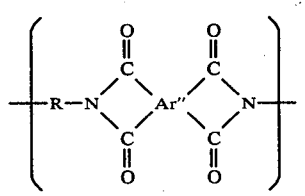
(III)

Such resins may include a structure wherein a part of the imide bond in the structures (I) and (III) remains in a state of an amide acid bond as its ring closing precursor having the formula:

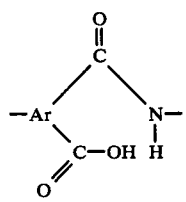

wherein Ar represents a trivalent aromatic group containing at least one 6-membered carbon ring in which two carbonyl groups are bonded to adjacent carbon atoms of the benzene ring in the Ar group. The following structures may be cited as examples of Ar:

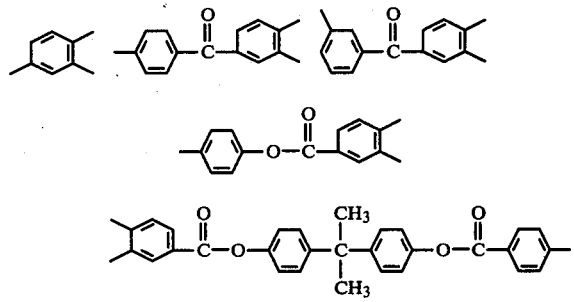

Ar' is a divalent aromatic group or aliphatic group containing at least one 6-membered carbon ring, and as examples of Ar', the following structures may be cited:

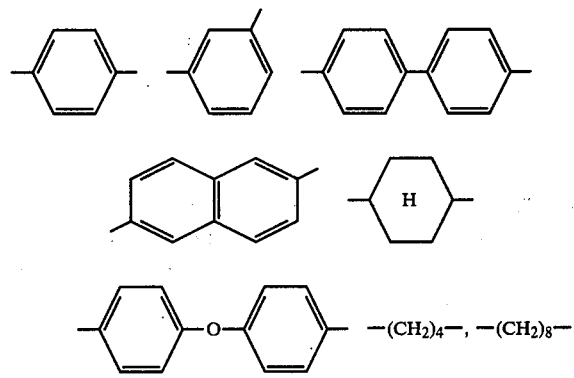

Ar" is a tetravalent aromatic group containing at least one 6-membered carbon ring carbonyl group in which two pairs of carbonyl groups are bonded to an adjacent carbon atom on the benzene ring of Ar" group, and as examples of Ar", the following structures may be cited.

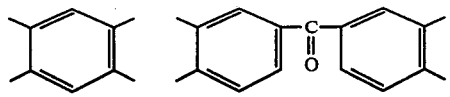

R is a divalent aromatic and/or aliphatic residue and as example of R, the following structures may be cited:

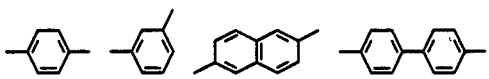

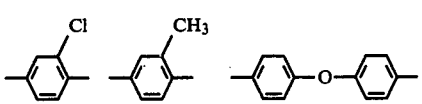

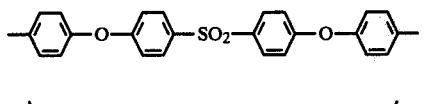

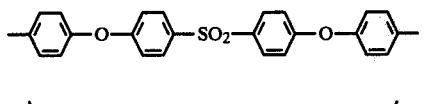

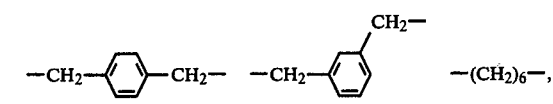

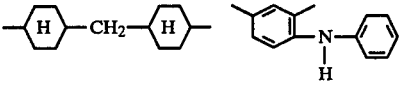

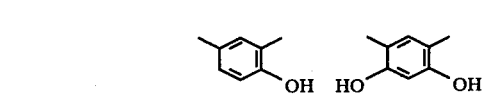

R' is hydrogen, a methyl group or a phenyl group.

An aromatic polyamideimide resin having the structural unit of Formula (I) may be prepared by reacting the following combinations of compounds in an organic polar solvent such as dimethyl formamide, dimethyl acetamide, N-methyl pyrolidone and cresol:

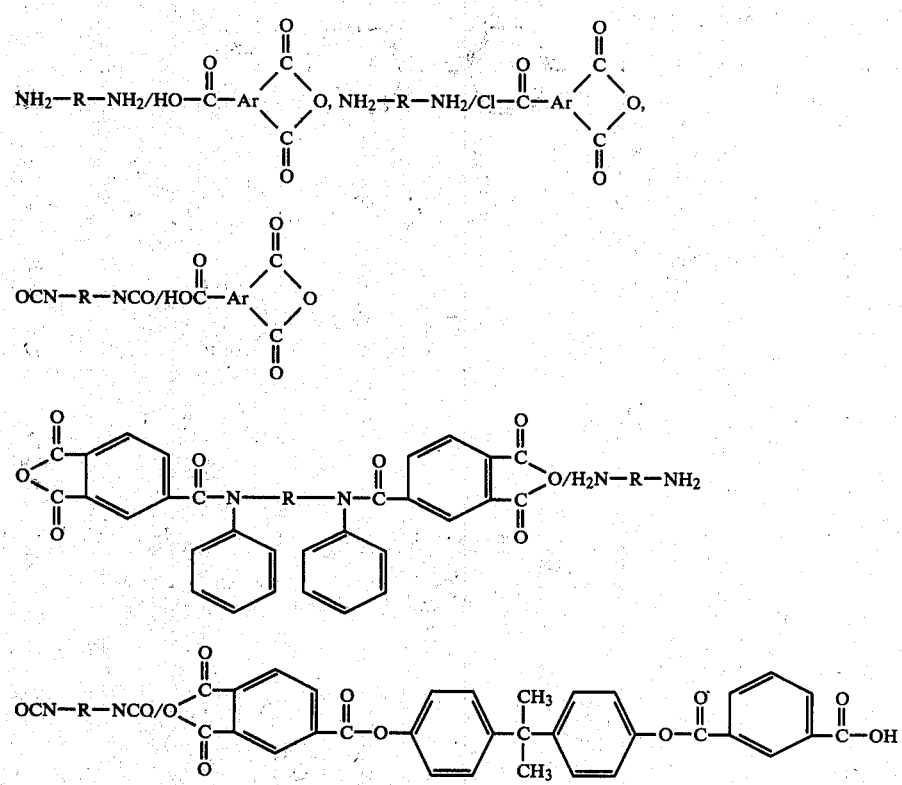

Introduction of the polyamide unit of the structural unit (II) and/or the polyimide unit of the structural unit (III) which may be partially copolymerized and bonded with the main component of structural unit (I) may be achieved by substituting a part of the material:

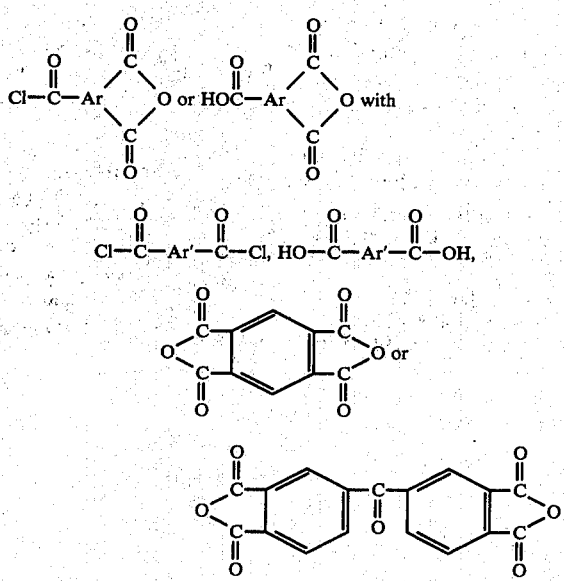

The following polyamideimide resin, commercially available from Amoco in the United States, is preferred and has the following molecular structure:

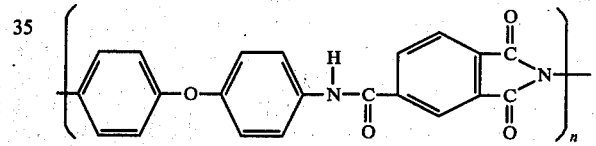

Processes for preparing polyamideimide resins are disclosed in detail, for example, in British Patent No. 1,056,564, U.S. Pat. No. 3,661,832, U.S. Pat. No. 3,669,937, French Patent No. 2,096,454, French Patent No. 1,515,066 and British Patent No. 1,181,446.

It is previously known that upon melt mixing the aromatic polyamideimide resins, the addition of a small amount, for example, 0.1–10% by weight of titanium oxide and fluorocarbon resin powder, is effective for restraining the discoloration of the resin and improving the melt viscosity characteristics thereof. The addition of the same is also effective in the present invention.

The thermoplastic resin added in order to improve the melt viscosity characteristics and moldability of the aromatic polyamideimide in the present invention, comprises at least one thermoplastic resin selected from the group consisting of a polyphenylene sulfide resin, a polyamide resin, a polysulfone resin, an aromatic polyester resin, a polyphenyleneether resin and a phenoxy resin. Preferably, these resins have a melt viscosity of not more than $1 \times 10^5$ (preferably $5 \times 10^4$) poise measured at 350° C. and a decomposition temperature of higher than 350° C., wherein the melt viscosity and decomposition temperature defined in the present invention are measured in accordance with the following measuring methods:

Namely, the melt viscosity is measured using a Melt Indexer manufactured by Toyoseiki Limited in Japan.

A sample of polymer, previously dried to absolute dryness is placed and maintained for eight minutes inside the cylinder heated at 350° C., and thereafter the sample is extruded from a nozzle (diameter 2.1 mm φ, length 8 mm) at the center of a die under a pressure of 325 to 21,600 g. The decomposition temperature is measured using a thermal weight measuring apparatus manufactured by Rigaku Denki Co., Ltd. of Japan, keeping a sample previously dried to absolute dryness, while heating the sample at a temperature accelerating speed of 10° C./min. in a nitrogen atmosphere. The weight of the sample is continuously measured and the temperature at which the weight decreases 1% is assumed to be the decomposition temperature.

A thermoplastic resin whose melt viscosity at 350° C. is higher than $1 \times 10^5$ poise, is not suitable for use in accordance with this invention, because it does not sufficiently improve the melt viscosity of the aromatic polyamideimide resin.

A thermoplastic resin whose decomposition temperature is lower than 350° C. makes it difficult to practice stable mixing operations, because thermal decomposition tends to occur upon melt mixing with the aromatic polyamideimide resin.

The thermoplastic resin to be blended with the polyamideimide in the present invention is selected from the group consisting of a polyphenylene sulfide resin, a polyamide resin, a polysulfone resin, an aromatic polyester resin, a polyphenyleneether resin and a phenoxy resin.

The ratio of the above mentioned thermoplastic resin contained in the composition of the present invention is 0.1–40% by weight. Sufficient improvement in the moldability of the polyamideimide resin cannot be obtained when the amount of the thermoplastic resin is less than 0.1% by weight. As the thermal stability of the above noted thermoplastic resin is considerably inferior to that of the aromatic polyamideimide resin, the heat resistance of the aromatic polyamideimide resin decreases to an unacceptable extent when the content of the thermoplastic resin is too large. Therefore, it is appropriate to choose as the upper limit the amount of 40% by weight (based upon the combined weight of the polyamideimide resin and the thermoplastic resin). The amount is usually kept within the above mentioned range considering the balance of the desired moldability level and the desired heat resistance. The amount of not more than 30% by weight is preferable, and the amount of not more than 20% by weight is most preferable.

The polyphenylene sulfide resin used in the present invention is represented by the general formula:

wherein "—Ph—" is a divalent aromatic group represented by the following formulae:

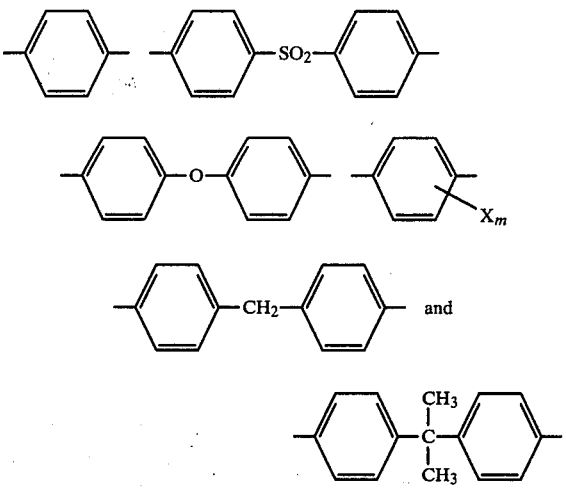

wherein X denotes F, Cl, Br or CH$_3$ and m denotes an integer of 1-4.

An especially typical polyphenylene sulfide resin is represented by the general formula

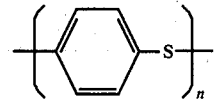

which is commercially available from Philips Petroleum in the United States under the trademark "RYTON". A process for preparing the same is disclosed in U.S. Pat. No. 3,354,129.

Polyphenylene sulfide resins, having various degrees of polymerization ranging from no crosslinking to partial crosslinking, may be freely prepared by subjecting the base resin to an after-heat-treatment step, and any such polymer having proper melt viscosity characteristics for the desired melt blend may be optionally selected.

It is noteworthy that when an aromatic polyamideimide resin is blended with the polyphenylene sulfide, the mold releasing property thereof is remarkably improved. Also, the melt viscosity characteristics are improved remarkably.

The aromatic polyamide resin used in the present invention is a linear polymer having an amide bond as a part of the repeating unit and includes polymers having properties of a very wide range whose melt viscosity at 350° C. is not more than $1 \times 10^5$ poise and whose decomposition temperature is not lower than 350° C. Examples of suitable polyamide resins include those represented by the following formulae:

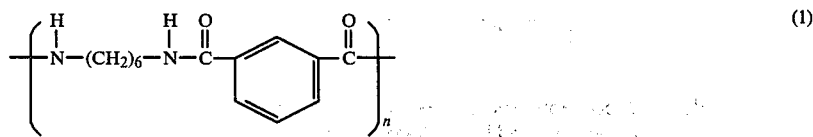
(1)

-continued

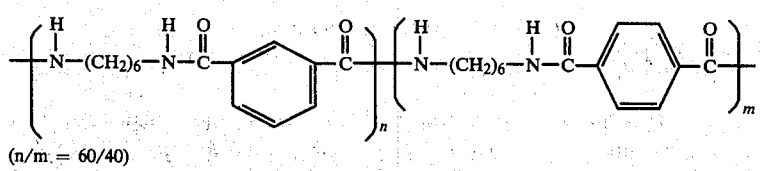
(n/m = 60/40)

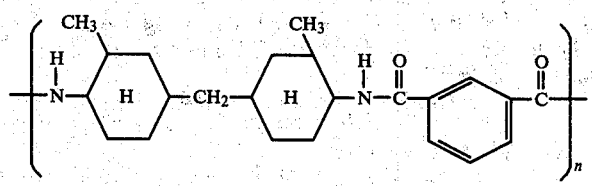

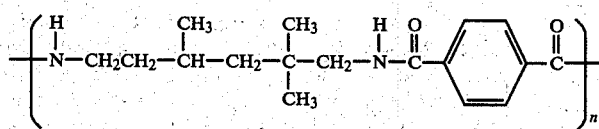

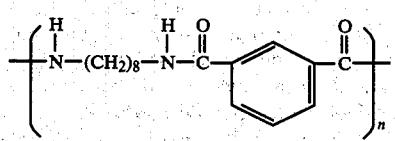

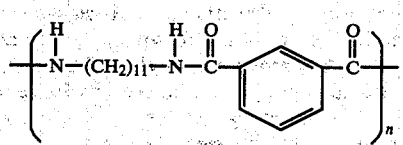

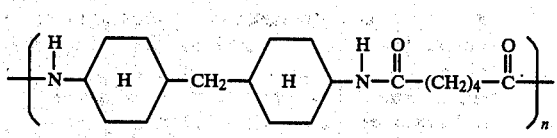

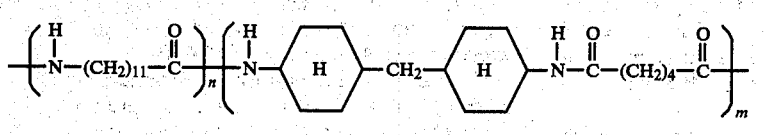
(n/m = 30/70)

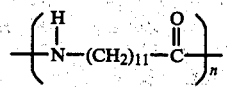

As a polysulfone resin usable in the present invention, a linear polymer containing three kinds of unit bonds consisting of an arylene bond, an ether bond and a sulfone bond, is suitable. Representative examples of these aromatic polysulfone resins include those represented by the following formulae:

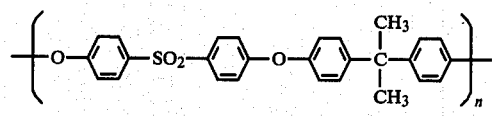
("Udel P-1700" manufactured by UCC)

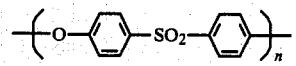

("Polyether-sulfone 200 P" manufactured by ICI)

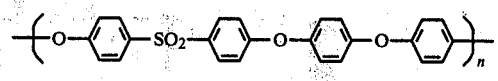

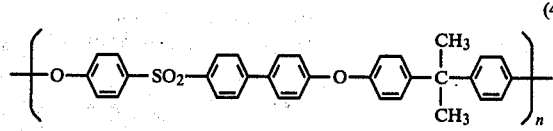

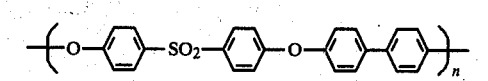

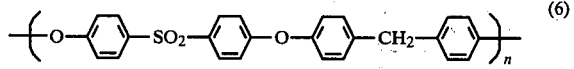 (6)

These aromatic polysulfones are easily manufactured by the methods disclosed, for example, in Japanese Patent Application Publication No. 7799/1967 and Japanese Patent Application Publication No. 617/1972, and one and/or not less than two kinds of them may be optionally selected in accordance with the desired melt blend.

The aromatic polyester resin used in the present invention is a linear polymer containing an ester bond as a part of the repeating unit and is characterized by a melt viscosity at 350° C. of not more than $1 \times 10^5$ (preferably $5 \times 10^4$) poise and a decomposition temperature of not lower than 350° C.

The selection of the particular aromatic polyester resins to be utilized is based on the standards of melt viscosity characteristics and heat resistant characteristics. The particular aromatic polyester resins to be used are selected from the polyester polymers containing not less than 50% by molecule (preferably 80% by molecule) of an aromatic polyester unit as the main structural unit which is synthesized from an aromatic dibasic acid or its derivatives and a divalent phenol represented by the general formula:

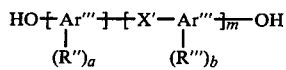

(wherein Ar''' denotes an aromatic nucleus such as a phenylene, a biphenylene and a naphthylene nucleus, R'' and R''' denote an alkyl group of $C_1$–$C_{10}$ or a halogen atom, X' denotes an alkylene group, an alkylidene group, an ether group, a carbonyl group, a sulfide group, a sulfoxide group or a sulfonyl group, m denotes zero or an integer of 1–25, n denotes 1, 2 or 3, a and b denote zero or an integer which is a number of the hydrogen atom or atoms on Ar''' being able to be substituted).

The aromatic dibasic acid above mentioned is represented by the following general formula:

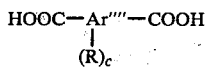

(wherein Ar'''' denotes an o-phenylene group, m-phenylene group, p-phenylene group and a naphthalene group, R denotes an alkylene group of $C_1$–$C_{10}$ or halogen atom, c denotes zero or an integer which is a number of the hydrogen atom or atoms on Ar''' being able to be substituted).

Derivatives of the above noted aromatic dibasic acids include the dichlorides or diesters, such as alkyl and phenyl derivatives.

Suitable examples of the divalent phenols illustrated by the general formula described above include:

Bis(4-hydroxyphenyl)ketone, bis(4-hydroxyphenyl)sulfide, bis(4-hydroxyphenyl)sulfone, 4,4'-dihydroxydiphenylether, 1,1-bis(4-hydroxyphenyl)ethane, 1,2-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chloro-phenyl)propane, 2,2-bis(4-hydroxy-3,5-dichlorophenyl)propane, 2,2-bis(4-hydroxynaphthyl)propane, bis(4-hydroxy-phenyl)phenylmethane, bis(4-hydroxyphenyl)diphenylmethane, bis(4-hydroxyphenyl)-4'-methylphenyl-methane, 1,1-bis(4-hydroxyphenyl)-2, 2,2-trichloroethane, bis(4-hydroxyphenyl)-(4'-chlorophenyl)methane, 1,1-bis(4-hydroxyphenyl)cyclohexane, bis(4-hydroxyphenyl)cyclohexylmethane, 4,4'-dihydroxy-diphenyl, 2,2'-dihydroxydiphenyl, 2,6-dihydroxy-naphthalene, hydroquinone, resorcinol, 2,6-dihydroxy-toluene, 2,6-dihydroxychloro-benzene, 3,6-dihydroxytoluene, etc.

Aromatic polyesters used in the present invention are prepared basically by an optional method in which:

(1) a divalent phenol or its derivatives and an aromatic dibasic acid or its derivatives are subjected to the well-known interfacial polycondensation method (A. J. Conix, Ind. Eng. Chem., 51, 147 (1959), Japanese Patent Application Publication No. 1959/1965, Laid-open Japanese Patent Application 51,094/1973, etc);

(2) the low temperature solution polycondensation method (British Patent No. 863,704, etc.), or (3) the melt polycondensation method (U.S. Patent No. 3,395,199, British Patent No. 924,607, etc.). If the occasion arises, phosgene and diphenylcarbonate may be copolymerized therewith in an amount of not more than 50 mol % (preferably 20 mol %).

Aromatic polyester resins preferably used in the present invention may be exemplified by the following structural formulae:

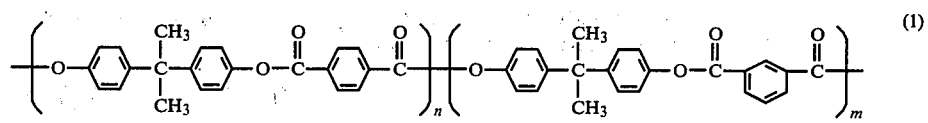 (1)

n/m = 50/50 molar ratio
("U-100" manufactured by Unitica in Japan)

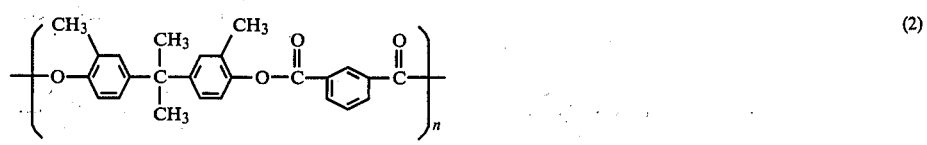 (2)

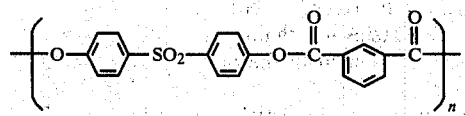  (3)

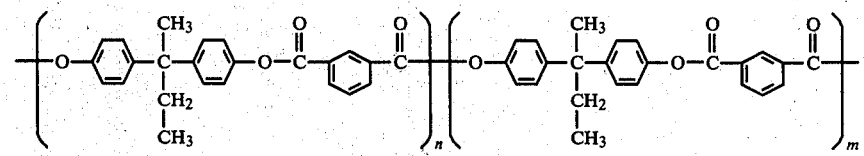  (4)

n/m = 70/30 molar ratio

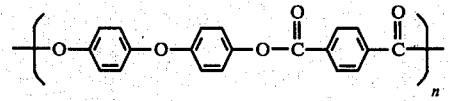  (5)

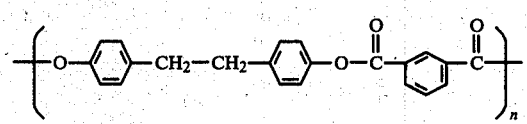  (6)

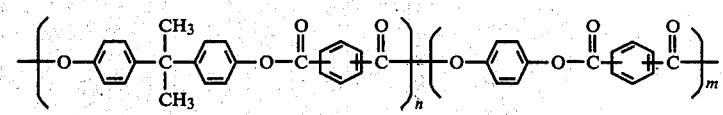  (7)

n/m = 75/25 molar ratio

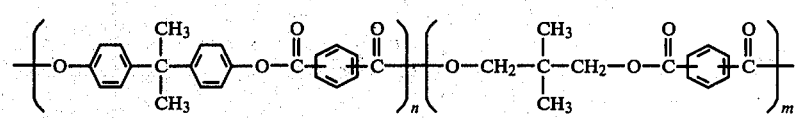  (8)

n/m = 90/10 molar ratio

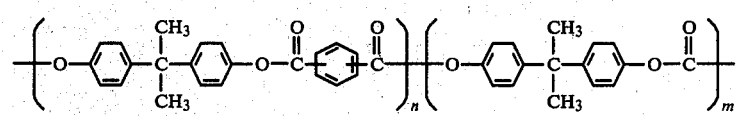  (9)

n/m = 97/3 molar ratio

The polyphenylene-ether resin which may be used in the present invention contains a phenylene-ether bond as a part of the repeating unit and has a decomposition temperature of not lower than 350° C.

Suitable polyphenylene-ether resins for use in the present invention are polymers which are synthesized from one or not less than two kinds of monobasic monocyclic phenols which consist of the repeating structural unit represented by the following general formula:

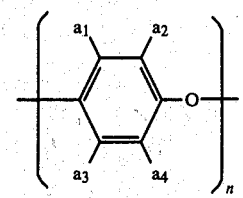

(wherein n denotes an integer of not less than 10, $a_1$, $a_2$, $a_3$ and $a_4$ denote hydrogen, halogen, a hydrocarbon group excluding tertiary α-carbon atom, a chlorinated hydrocarbon group which contains at least two carbon atoms between the halogen atom and the phenyl nucleus and excludes a tertiary α-carbon atom, and an oxy-hydrocarbon group excluding tertiary α-carbon atom).

These polyphenylene-ether resins are manufactured by various kinds of catalyzed methods and non-catalyzed methods from monocyclic phenols represented by the following general formula:

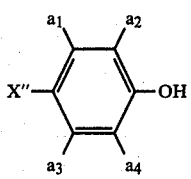

(wherein $a_1$, $a_2$, $a_3$ and $a_4$ denote the same as is described above, X" denotes hydrogen or halogen).

In the most typical manufacturing method 2,6-dimethylphenol is subjected to oxidative dehydrogenation polycondensation in an organic solvent and under the existence of a cuprouschloride/pyridine complex catalyst and oxygen. Many kinds of catalysts are developed other than a cuprouschloride/pyridine complex. These manufacturing methods are disclosed in detail in U.S. Pat. Nos. 3,306,874, 3,306,875, 3,257,357, e,384,619, 3,442,885, 3,573,257, 3,455,880, etc. The methods in which monocyclic phenols as above described are oxidized under the existence of PbO$_2$, AgO, etc., are disclosed in U.S. Pat. No. 3,382,212.

Examples of preferable polyphenylene-ether resins for use in the present invention may be represented by the following structural formulae:

(1)
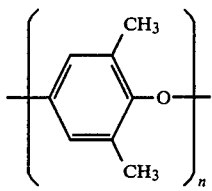

("PPO 531-801" manufactured by General Electric Co.)

(2)
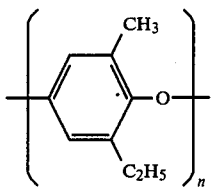

(3)
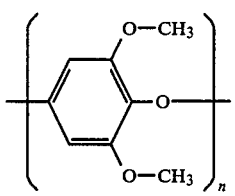

(4)
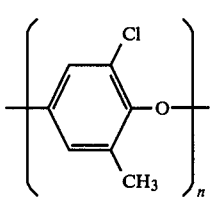

(5)
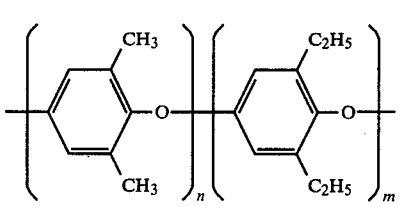

(6)
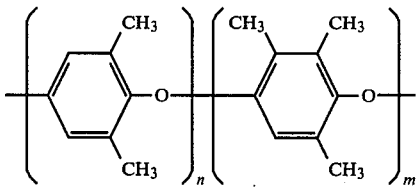

Among these examples, poly(2,6-dimethyl-1,4-phenylene)ether (1) is the most preferable.

Polyphenylene-ether resin compositions containing a melt viscosity co-modifier, such as titanium oxide, may also be used effectively as the thermoplastic resin component of the present invention.

Phenoxy resins which may be used as the thermoplastic resin component of the present invention are linear polymers which contain a hydroxy-ether unit and which have melt viscosity characteristics at 350° C. of not more than $1 \times 10^5$ (preferable $0.5 \times 10^5$) poise.

Phenoxy resins are easily synthesized by reacting a divalent phenol and a halogenated epoxide under the existence of an alkali. The polymer is represented by the following general formula:

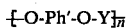

(wherein Ph′ denotes the residue of a divalent phenol, Y denotes the epoxide residue containing a hydroxy group and n denotes an integer of not less than 30). Manufacturing methods are disclosed in detail in, for example, U.S. Pat. Nos. 3,262,988, 3,375,297, 3,409,581, etc.

Examples of divalent phenols which may be used in the manufacture of phenoxy resins comprise, 2,2′-bis(4-hydroxyphenyl)propane, 2,2′-bis′(3,5-dichloro-4-hydroxyphenyl)propane hydroxyphenyl)ethane, bis(4-hydroxyphenyl)methane, bis-(4-hydroxyphenyl)sulfide, bis(4-hydroxyphenyl)sulfone, 1,1′-bis-(4-hydroxyphenyl)cyclohexane, bis(4-hydroxyphenyl)ether, 1,1′-bis-(4-hydroxyphenyl)-2-phenylethane, etc.

Examples of halogenated epoxides used in the manufacture of phenoxy resins include, epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, etc.

Representative examples of preferable phenoxy resins include compounds having the following structural formulae:

(1)
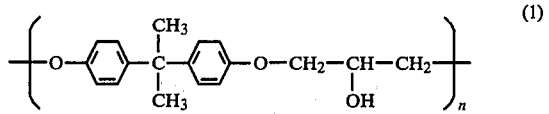

("phenoxy resin PKHH" manufactured by UCC Co.)

(2)
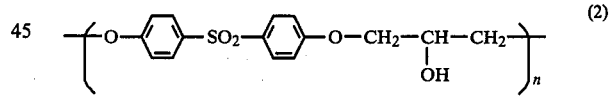

(3)
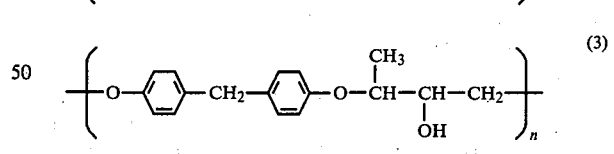

(4)
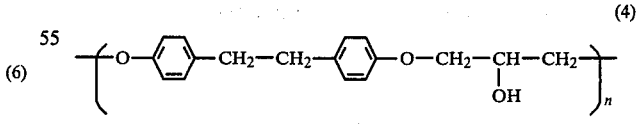

(5)
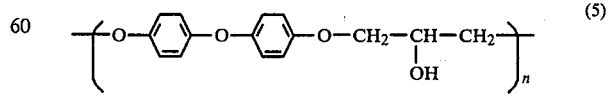

(6)
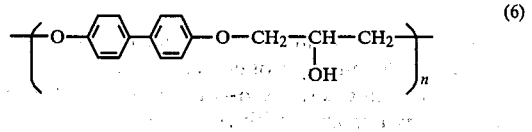

In preparing a composition in accordance with the present invention, one or the mixture of not less than two kinds of phenoxy resins, as above described, may be optionally selected.

The polyamideimide resin composition of the present invention may optionally contain many kinds of fillers. Fillers are added in order to improve heat resistance, mechanical properties, resistance to chemical substances, abrasion characteristics, electrical characteristics, flame retardation, etc. Suitable fillers are exemplified as follows. They include synthetic and natural compounds which are stable at temperatures of at least 300° C., such as graphite, carborundum, silicon powder, molybdenum disulfide, flurocarbon resin, glass fibers, carbon fibers, boron fibers, silicon carbide fibers, carbon whiskers, asbestos fibers, asbestos, metal fibers, antimony trioxide, magnesium carbonate, calcium carbonate, barium sulfate, silica, calcium metasilicate, powders of metals such as iron, zinc, aluminum and copper, glass beads, glass balloons, alumina, talc, diatomaceous earth, clay, kaolin, gypsum, calcium sulfite, hydrated alumina, mica, other various kinds of metal oxides, inorganic pigments, etc.

The suitable amount of these fillers is not more than 250 parts by weight (preferably 200 parts by weight) based on 100 parts by weight of the total weight of the resin composition consisting of an aromatic polyamideimide resin and at least one kind of thermoplastic resin selected from the group consisting of a polyphenylene sulfide resin, a polyamide resin, a polysulfone resin, an aromatic polyester resin, a polyphenylene-ether resin and a phenoxy resin.

In the case where the fillers are added to the aromatic polyamideimide resin itself, uniform melt blending is difficult when the amount of more than 10 parts by weight filler per 100 parts by weight of the aromatic polyamideimide resin is utilized. However, when the filler is added to the heat resistant molding composition of the present invention, the amount of not more than 250 parts by weight of filler per 100 parts by weight of the composition allows relatively easy melt blending. The addition of more than 250 parts by weight filler is not effective for improving the properties of the entire resin composition.

For mixing and preparing the composition of the present invention, it is possible to utilize an apparatus used for melt blending ordinary rubber or plastics, for example, hot rolls, Banbury mixers, brabenders and extruders. The mixing operations are continued until a uniform blend is obtained. The mixing temperature is established at a value which is more than the temperature at which the blend system can be melted, but is less than the temperature at which thermal decomposition of the blend system begins. Solid mixing temperature being normally selected from the range of 250°–400° C., and preferably from the range of 300°–380° C.

Upon mixing and preparing the composition of the present invention, it is possible to separately supply the aromatic polyamideimide resin, thermoplastic resin component and optional filler to the melt mixer. It is also possible to premix these materials using a mortar, Henschel's mixer, ball mill and ribbon blender, and then supply the premix materials to the melt mixer.

The composition of the present invention forms a uniform melt blend and may be shaped by injection molding or extrusion molding techniques which are high in productivity. However, the composition may be otherwise shaped by compression molding and sintering molding.

For producing shaped articles utilizing injection molding or extrusion molding machines equipped with a screw cylinder to promote excellent melt blending performance, it is not always necessary to separately prepare the uniformly melt blending composition in advance. By directly supplying the component materials to the screw hopper either separately or after dry blending thereof, a shaped article of a uniform composition may be produced in one stage. However, the desired uniform blend can be more easily obtained by a two-stage blending method in which master pellets are prepared by melt blending the filler and desired thermoplastic resin component in advance, and then the master pellets are further melt blended with the polyamideimide resin component.

Shaped articles obtained by melt molding the heat resistant molding resin composition of the present invention exhibit excellent properties in terms of heat resistance, mechanical characteristics, electrical characteristics, sliding characteristics and solvent resistance characteristics, and may be utilized in many ways. They are useful as, for example, auto parts, electrical and electronic parts, water supplying and distributing machine parts, office machine parts, aircraft parts and special machine parts.

The present invention will be described in more detail hereinafter by reference to the following examples, wherein values of %, ratios, and parts, show % by weight, weight ratios and parts by weight, respectively, unless otherwise specified. Melt viscosity of the resin composition in the present examples is measured using a Melt Indexer manufactured by Toyoseiki Limited in Japan, by placing a sample dried to an absolute dry state in advance inside a cylinder heated at 350° C., and after the sample has remained inside the cylinder for 8 minutes, a load of 325–21,600 g is placed thereon and the sample is extruded from a nozzle (diameter 2.1 mm $\phi$, length 8 mm) at the center of a die and the viscosity is then measured. Measurement of the properties of the shaped articles in the present examples has been done according to the corresponding following standards—Flexural strength and flexural modulus: ASTM-D-790; Izod impact strength: ¼", ASTM-D-256; heat deflection temperature: 18.56 kg/cm$^2$, ASTM-D-648-56.

EXAMPLES 1–7 AND COMPARATIVE EXAMPLES 1–3

At compositions shown in Table 1, a polyamideimide resin component ("TORLON 4203L" manufactured by AMOCO) and a polyhexamethylene isophthalamide resin component having a relative viscosity of 2.05 (polymer concentration 1%, solvent: 98% concentrated sulfuric acid, measuring temperature 25° C.), a melt viscosity of 1,200 poise and a decomposition temperature of 396° C., or a polyphenylene sulfide resin component (hereinafter referred to as PPS resin) ("RYTON P-4" manufactured by Philips Petroleum) represented by the formula

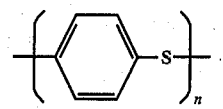

were dry blended. Thereafter, the dry blended mixture was supplied to a brabender plast-graph extruder and while the dry blends were being melt kneaded therein at a treating temperature of 360° C. and a screw rpm of 25, these blends were extruded twice therethrough to obtain uniformly melt blended pellets. During this operation, when stationary states were achieved by the second kneading, the torques acting on the rotary screw shaft were measured to obtain standards of the melt viscosity values of the compositions. Subsequently, the thus obtained uniformly melt blended pellets were compression molded at a temperature of 280°–350° C. under the highest pressure of 10–150 kg/cm² (as the content of polyhexamethylene isophthalamide resin or PPS resin increased, lower molding temperatures and the highest pressure were utilized) to prepare shaped samples. When the physical properties of these samples were measured, the results as shown in Table 1 were obtained.

It is noted that, especially in the cases in which the composition comprised PPS resin, the mold releasability of the shaped articles were remarkably improved.

As will be seen from the results shown in Table 1, in Examples 1–7, compared with Comparative Example 1, (wherein neither polyhexamethylene isophthalamide resin or PPS resin were added), the torque at the time of melt blending was drastically decreased.

When the amount of polyhexamethylene isophthalamide resin or PPS resin was increased in the order of Examples 1, 2, 3 and 4, or 5, 6, 7, the torque at the time of melt blending gradually lowered and thus the effect of improving the melt viscosity rose. However, in proportion thereto, the physical properties of the resulting shaped article such as, flexural strength, Izod impact strength and heat deflection temperature generally decreased. As is shown in Comparative Examples 2 or 3 wherein the amount of polyhexamethylene isophthalamide resin or PPS resin added was increased to an extremely large amount of 50%, the flexural strength, Izod impact strength and heat deflection temperature on occasions lowered to levels which could not withstand practicel use. Therefore, the Comparative Examples are not preferable.

TABLE 1

| Example and Comparative Example No. | Examples | | | | | | | Comparative Examples | | |
|---|---|---|---|---|---|---|---|---|---|---|
| | 1 | 2 | 3 | 4 | 5 | 6 | 7 | 1 | 2 | 3 |
| [Composition of a melt blend] | | | | | | | | | | |
| "Torlon 4203 L" (parts) | 95 | 90 | 80 | 70 | 98 | 90 | 80 | 100 | 50 | 50 |
| Polyhexamethylene isophthalamide (parts) | 5 | 10 | 20 | 30 | 0 | 0 | 0 | 0 | 50 | 0 |
| PPS resin (parts) | 0 | 0 | 0 | 0 | 2 | 10 | 20 | 0 | 0 | 50 |
| Torque at the time of melt blending (g m) | 1,400 | 600 | 400 | 200 | 1,500 | 700 | 420 | 2,100 | 100 | 200 |
| [physical properties of a shaped article] | | | | | | | | | | |
| Flexural strength (kg/cm²) | 1,540 | 1,800 | 1,190 | 740 | 1,710 | 1,100 | 850 | 1,300 | 440 | 440 |
| Flexural modulus (kg/cm²) × 10⁴ | 3.8 | 3.7 | 3.9 | 3.6 | 4.1 | 3.9 | 4.0 | 4.0 | 3.5 | 3.8 |
| Izod impact strength (kg cm/cm) | 36 | 25 | 8 | 7 | 24 | 12 | 9 | 15 | 4 | 4 |
| Heat deflection temperature (°C.) | 245 | 229 | 192 | 176 | 246 | 247 | 245 | 245 | 120 | 181 |

EXAMPLES 8–10 AND COMPARATIVE EXAMPLES 4–5

A polyamideimide resin ("TORLON 4000T" manufactured by AMOCO), a polyhexamethylene isophthalamide/polyhexamethylene terephthalamide copolymer resin synthesized by melt polymerization, and represented by the formula:

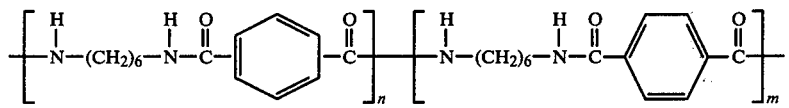

(n/m=60/40 molar ratio) having a melt viscosity of 880 poise and a decomposition temperature of 395° C., and ethylene tetrafluoride resin ("Afronpolymist F-5" manufactured by Asahi Glass Co., Ltd. in Japan) were dry blended in the various composition proportions shown in Table 2. Thereafter, while each of the dry blends was being melt kneaded in a 40 mm φ extruder (treating temperature 350°–360° C.) equipped with a screw having a compression ratio of 2.0/1., it was extruded therethrough to obtain uniformly blended pellets. During this operation, when electrical load currents acting on the screw shaft (30 rpm) of the extruder were measured, melt viscosity value standards were obtained.

Next, the three-component uniformly blended pellets above obtained were subjected to an ordinary injection molding machine (barrel temperature 310°–350° C., mold temperature 150°–200° C., injection pressure 1500–2000 kg/cm²) to produce shaped samples. When the physical characteristics of these were measured, the results obtained are shown in Table 2 as follows:

TABLE 2

| Example and Comparative example No. | Examples | | | Comparative Examples | |
|---|---|---|---|---|---|
| | 8 | 9 | 10 | 4 | 5 |
| [Composition of a melt blend] | | | | | |
| "Torlon 4000 T" (parts) | 95 | 90 | 80 | 100 | 50 |
| Polyamide resin (parts) | 5 | 10 | 20 | 0 | 50 |

TABLE 2-continued

|  | Examples | | | Comparative Examples | |
|---|---|---|---|---|---|
| Ethylene tetrafluoride resin (parts) | 2.9 | 2.7 | 2.4 | 3.0 | 1.5 |
| Electrical load current at the time of melt blending (A) | 12 | 11 | 8 | 20 | 7 |
| [Physical properties of a shaped article] | | | | | |
| Flexural strength (kg/cm$^2$) | 1,510 | 1,210 | 1,050 | 1,280 | 450 |
| Flexural modulus (kg/cm$^2$) | 4.0 × 10$^4$ | 3.8 × 10$^4$ | 3.6 × 10$^4$ | 4.1 × 10$^4$ | 3.5 × 10$^4$ |
| Izod impact strength (kg cm/cm) | 18.4 | 13.7 | 8.2 | 14.8 | 2.8 |
| Heat deflection temperature (°C.) | 242 | 221 | 201 | 261 | 133 |

As can be seen from the results as shown in Table 2, in the cases of Examples 8–10, compared with Comparative Example 4 wherein a polyamide resin, as a melt viscosity improving agent, was not added, the electrical load currents decreased at the time of melt blending and the melt viscosity characteristics were remarkably improved.

When the amount of polyamide resin added was increased in the order of Examples 8, 9 and 10, the electrical load current gradually decreased at the time of melt blending and the melt blending became easier by that proportion. However, the mechanical and thermal properties of a shaped article somewhat decreased concurrently therewith. As shown in Comparative Example 5, when the amount of polyamide resin added was increased to an extremely large amount of 50%, the mechanical and thermal properties drastically decreased, resulting in an inferior product.

EXAMPLE 11

Eighty parts of polyamideimide resin powder ("TORLON 4000T" manufactured by AMOCO), 20 parts of a polyamide resin represented by the formula:

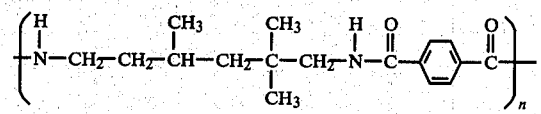

("Trogamid T" manufactured by Dynamit Nobel) having a melt viscosity of 2,770 poise and a decomposition temperature of 381° C., and 3 parts of titanium oxide were dry blended. Thereafter, while the dry blend was being melt kneaded in a 40 mm φ extruder (treating temperature 350°–360° C.) equipped with a screw having a compression ratio of 2.0/1, it was extruded therethrough to obtain uniformly blended pellets. During this extrusion operation, the electrical load current acting on the screw shaft (30 rpm) of the extruder was stable and was measured to be a relatively low level of 8–10 amperes.

Next, the above obtained three-component uniformly blended pellets were subjected to an ordinary injection molding machine (barrel temperature 310°–350° C., mold temperature 170° C., injection pressure 1,500 kg/cm$^2$) to prepare a shaped sample. The physical characteristics of this sample were measured, and the results obtained are shown in Table 3. This sample provides an excellent balance of physical properties.

TABLE 3

| Flexural strength (kg/cm$^2$) | 851 |
|---|---|
| Flexural modulus (kg/cm$^2$) | 3.9 × 10$^4$ |
| Izod impact strength (kg . cm/cm) | 8.4 |
| Heat deflection temperature (°C.) | 193 |

Ninety parts of a polyamideimide resin synthesized by a solution polymerization method in N-methyl pyrrolidone in the presence of phosphoric acid as a catalyst and represented by the formula:

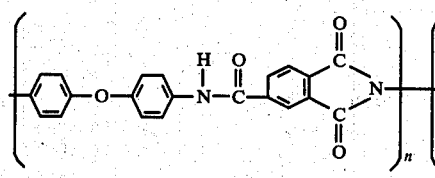 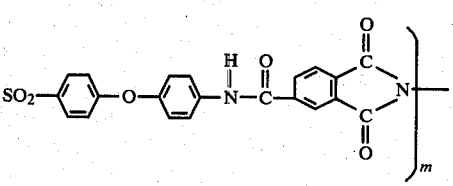

(n/m = 50/50 molar ratio)

having a logarithmic viscosity of 0.65 (polymer concentration: 0.5%, solvent: N-methyl pyrrolidone, measuring temperature: 30° C.), 10 parts of polyhexamethylene isophthalamide resin (of the same type as used in Example 1), and 1 part of ethylene tetrafluoride resin ("Afronpolymist F-5" manufactured by Asahi Glass Co., Ltd. in Japan) were dry blended. Thereafter, the dry blended materials were supplied to a brabender plastgraph extruder and while the dry blend was being melt kneaded therein at a treating temperature of 340° C. and a screw r.p.m. of 25, the extrusion operations were repeated twice to obtain uniformly blended pellets. During these operations, the torque acting on the screw shaft of the brabender was measured and was stable at a low level of 200–300 g m.

Next, the above obtained three-component uniformly blended pellets were compression molded at 300° C. under a pressure of 50 kg/cm$^2$ to prepare a shaped sample. The physical properties of this sample were measured, and the results are shown in the following Table 4. This sample is excellent in both mechanical and thermal properties.

TABLE 4

| Flexural strength | (kg/cm$^2$) | 1,200 |
|---|---|---|
| Flexural modulus | (kg/cm$^2$) | 3.8 × 10$^4$ |
| Izod impact strength | (kg cm/cm) | 17.2 |
| Heat deflection temperature | (°C.) | 220 |

COMPARATIVE EXAMPLE 6

Twenty parts of an all aromatic polyamide resin synthesized by a low temperature solution polymerization method using an acid chloride and represented by the formula:

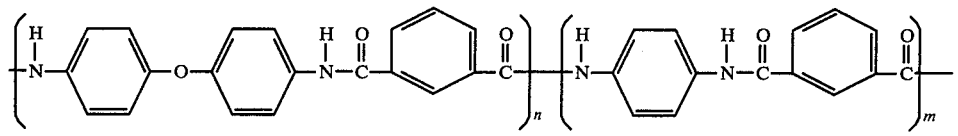

having a logarithmic viscosity of 0.55 (polymer concentration: 0.5%, solvent: N-methylpyrrolidone containing LiCl in an amount of 5%, measuring temperature 30° C.), a melt viscosity of $5 \times 10^5$ poise and a decomposition temperature of 417° C., and 80 parts of a polyamideimide resin ("Torlon 4203 L" manufactured by Amoco) were dry blended and thereafter supplied to a brabender plast-graph extruder, the same as in Example 1. When the torque, at the time of melt blending at a treating temperature of 360° C. and a screw r.p.m. of 25, was measured, it was 2,500–2,700 g m. This torque value was far higher than that of Comparative Example 1 wherein polyamide resin as a melt viscosity improving agent was not added.

Accordingly, it is apparent that the addition of a polyamide resin having too high of a melt viscosity is not preferable for purposes of improving the melt viscosity characteristics.

COMPARATIVE EXAMPLE 7

Twenty parts of nylon 6 having a decomposition temperature of 334° C. ("CM-1011" manufactured by Toray Industries, Inc.) and 80 parts of a polyamideimide resin ("Torlon 4203 L" manufactured by Amoco) were dry blended. Thereafter, when the dry blend was supplied to a brabender plast-graph extruder and melt blended at a treating temperature of 330° C. and a screw r.p.m. of 25, the nylon 6 decomposed, and the decomposed polymer and polyamideimide resin separated in layers. Therefore, uniformly melt blended pellets were not obtained.

When it was attempted to blend the two at a treating temperature of 300° C., the decomposition of nylon 6 was avoided. However, the polyamideimide resin hardly melted and uniformly melt blended pellets were not obtained either.

EXAMPLES 13-22 AND COMPARATIVE EXAMPLES 8-11

In the various composition proportions shown in Table 6, a polyamideimide resin ("Torlon 4203 L" manufactured by AMOCO) and the thermoplastic resins shown in Table 5 were dry blended. Thereafter, the dry-blended mixture was supplied to a brabender plast-graph extruder and while the dry blends were being melt kneaded therein at a treating temperature of 360° C. and a screw r.p.m. of 25, the blends were extruded twice therethrough to obtain uniformly melt blended pellets having melt viscosities shown in Table 6.

Next, the thus obtained uniformly melt blended pellets were compression molded at a temperature of 300°–350° C. under the pressure of 10–120 kg/cm², to prepare shaped samples. The physical properties of these samples were measured, and the results are shown in Table 6.

As can be seen from the results shown in Table 6, in the cases of Examples 13-22, compared with Comparative Example 1 wherein a thermoplastic resin was not added, when the thermoplastic resin is added, a remarkable decrease in the melt viscosity is attained.

As the amount of the thermoplastic resin component is increased, the melt blendability and moldability are improved. However, in proportion thereto, flexural strength, Izod impact strength and heat deflection temperature of the shaped articles are somewhat decreased. As shown in Comparative Examples 8-11, when the amount of thermoplastic resin component is increased to an extremely large amount of 60%, flexural strength, Izod impact strength and heat deflection temperature are drastically decreased, resulting in an inferior shaped article.

TABLE 5

| Melt viscosity modifiers | Manufacturing firms and Trademark | Structural formula | 1% Decomposition temperature (°C.) | Melt viscosity (at 350° C.) (poise) |
|---|---|---|---|---|
| (A) Aromatic polyester resin | Unitica "U-100" | [structure shown] (n/m = 50/50 molar ratio) | 418 | 2,700 |
| (B) Aromatic polysulfone | UCC "Udel P-1700" | [structure shown] | 464 | 5,600 |

TABLE 5-continued

| Melt viscosity modifiers | Manufacturing firms and Trademark | Structural formula | 1% Decomposition temperature (°C.) | Melt viscosity (at 350° C.) (poise) |
|---|---|---|---|---|
| (C) Phenoxy resin | UCC "Phenoxy PKHH" | $\left\{-O-\bigcirc-\underset{CH_3}{\overset{CH_3}{C}}-\bigcirc-O-CH_2-\underset{OH}{CH}-CH_2-\right\}_n$ | 388 | 230 |
| (D) Polyphenylene-ether resin | GE "PPO-531-801" | $\left\{\bigcirc\underset{CH_3}{\overset{CH_3}{-}}O-\right\}_n$ /TiO$_2$ (5 wt. %) /High impact polystyrene (15 wt. %) | 364 | 8,100 |
| (E) Polyhexamethylene isphthalamide resin | Toray | $\left\{-\overset{H}{N}-(CH_2)_6-\overset{H}{N}-\overset{O}{\overset{\|}{C}}-\bigcirc-\overset{O}{\overset{\|}{C}}-\right\}_n$ [$\eta_r$ = 2.05 (1% in 98% H$_2$SO$_4$ at 25 °C.)] | 396 | 1,200 |
| (F) Polyphenylene sulfide resin | Philips "Ryton P-4" | $\left\{\bigcirc-S-\right\}_n$ | 449 | 31,000 |

TABLE 6

| | Example and Comparative Example No. | | | | | | | | | | | | | | |
|---|---|---|---|---|---|---|---|---|---|---|---|---|---|---|---|
| | Examples | | | | | | | | | | Comparative Examples | | | | |
| | 13 | 14 | 15 | 16 | 17 | 18 | 19 | 20 | 21 | 22 | 1 | 8 | 9 | 10 | 11 |
| [Composition of a melt blend] | | | | | | | | | | | | | | | |
| "Torlon 4203 L" (parts) | 95 | 90 | 80 | 65 | 90 | 70 | 95 | 80 | 90 | 70 | 100 | 40 | 40 | 40 | 40 |
| (A) "U-100" (parts) | 5 | 10 | 20 | 35 | 0 | 0 | 0 | 0 | 0 | 0 | 0 | 60 | 0 | 0 | 0 |
| (B) "Udel P 1700" (parts) | 0 | 0 | 0 | 0 | 10 | 30 | 0 | 0 | 0 | 0 | 0 | 0 | 60 | 0 | 0 |
| (C) "Phenoxy PKHH" (parts) | 0 | 0 | 0 | 0 | 0 | 0 | 5 | 20 | 0 | 0 | 0 | 0 | 0 | 60 | 0 |
| (D) "PPO 531–801" (parts) | 0 | 0 | 0 | 0 | 0 | 0 | 0 | 0 | 10 | 30 | 0 | 0 | 0 | 0 | 60 |
| Melt viscosity (at 350° C.) (poise) × 10$^3$ | 143 | 53 | 5 | 4.5 | 260 | 180 | 158 | 21 | 206 | 110 | 400–600 | 2.9 | 12 | 1.2 | 17 |
| [Physical properties of a shaped article] | | | | | | | | | | | | | | | |
| Flexural strength (kg/cm$^2$) | 1,030 | 1,040 | 970 | 790 | 1,070 | 950 | 980 | 890 | 990 | 900 | 1,300 | 310 | 710 | 670 | 470 |
| Flexural modulus (kg/cm) × 10$^4$ | 4.2 | 3.9 | 4.3 | 4.2 | 3.8 | 3.5 | 3.9 | 3.6 | 3.7 | 3.7 | 4.0 | 2.7 | 3.0 | 2.7 | 2.9 |
| Izod impact strength (kg cm/cm) | 11 | 10 | 9 | 9 | 16 | 12 | 11 | 9 | 11 | 11 | 15 | 2 | 6 | 3 | 5 |
| Heat deflection temperature (°C.) | 235 | 227 | 223 | 195 | 251 | 225 | 249 | 182 | 244 | 215 | 245 | 155 | 180 | 89 | 175 |

EXAMPLE 23

Fifteen parts of poly[1,2-bis(4-hydroxyphenyl)ethane]isophthalate synthesized by a melt polymerization method and represented by the formula:

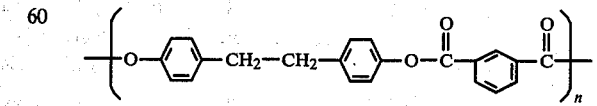

having a melt viscosity of $1.3 \times 10^3$ poise and a decomposition temperature of 387° C., 85 parts of a polyamideimide resin powder ("Torlon 4,000 T" manufactured by AMOCO), and 2 parts of titanium oxide were dry blended. Thereafter, the dry blended mixture was melt kneaded by the same method as in Example 1 to obtain uniformly melt blended pellets. Subsequently, the thus obtained compositions were compression molded at a temperature of 330° C. under a pressure of 50 kg/cm² to prepare shaped samples. The physical properties and melt viscosity of these samples were measured and the results are shown in the following Table 7. The shapes exhibited an excellent balance of physical properties and melt viscosity characteristics.

TABLE 7

| Melt viscosity (at 350° C.) | [poise] | 18 × 10³ |
|---|---|---|
| Flexural strength | [kg/cm²] | 1,050 |
| Flexural modulus | [kg/cm²] | 4.1 × 10⁴ |
| Izod impact strength | [kg cm/cm] | 8.7 |
| Heat deflection temperature | [°C.] | 220 |

EXAMPLE 24

Eighty five parts of a polyamideimide resin ("Torlon 4203 L" manufactured by AMOCO) and 15 parts of an aromatic polysulfone resin ("Polyethersulfone 200 P" manufactured by ICI) represented by the formula:

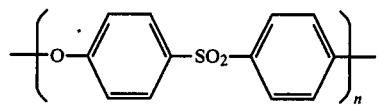

having a decomposition temperature of 451° C. and a melt viscosity of 18×10³ poise, were dry blended. Thereafter, the resulting dry blended mix was melt kneaded by the same method as in Example 1 to obtain uniformly melt blended pellets. Subsequently, the thus obtained uniformly blended pellets were compression molded at a temperature of 340° C. under a pressure of 30 kg/cm² to prepare shaped samples. The physical properties of the samples were measured, and the results are shown in the following Table 8. The shapes exhibited an excellent balance of physical properties and melt viscosity characteristics.

TABLE 8

| Flexural strength | [kg/cm²] | 1,090 |
|---|---|---|
| Flexural modulus | [kg/cm²] | 3.9 × 10⁴ |
| Izod impact strength | [kg cm/cm] | 12 |
| Heat deflection temperature | [°C.] | 251 |

EXAMPLE 25

Fifteen parts of a phenoxy resin represented by the formula:

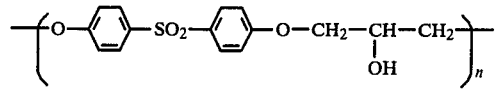

having a melt viscosity of 7.4×10³ poise, 83 parts of an aromatic polyamideimide resin powder ("Torlon 4000 T" manufactured by AMOCO), and 2 parts of titanium oxide were dry blended. Thereafter, the resulting dry blended mixture was melt kneaded by the same method as in Example 1 to obtain uniformly melt blended pellets having a melt viscosity as shown in Table 9.

Next, the above obtained uniformly melt blended pellets were compression molded at a temperature of 340° C. under the pressure of 70 kg/cm² to prepare shaped samples. The physical properties of the samples were measured, and the results are shown in the following Table 9. The shapes exhibited an excellent balance of melt viscosity characteristics and physical properties.

TABLE 9

| Melt viscosity (at 350° C.) | [poise] | 23 × 10³ |
|---|---|---|
| Flexural strength | [kg/cm²] | 1,020 |
| Flexural modulus | [kg/cm²] | 3.7 × 10⁴ |
| Izod impact strength | [kg cm/cm] | 9.9 |
| Heat deflection temperature | [°C.] | 216 |

EXAMPLES 26–34

A polyamideimide resin ("Torlon 4203 L" manufactured by AMOCO), various kinds of thermoplastic resins, and fillers were dry blended in the composition proportions shown in Table 10. Thereafter, while the dry blends were being melt kneaded in a 40 mm φ extruder (treating temperature 350°–360° C.) equipped with a screw having a compression ratio of 2.0/1, the blend was extruded therethrough to obtain uniformly blended pellets. The electrical load current acting on the screw shaft of the extruder during this extrusion operation was 18–24 amperes and stable.

Next, the above obtained three component uniformly blended pellets were subjected to an ordinary injection molding machine (barrel temperature 310°–350° C., mold temperature 170°–250° C., injection pressure 1,600 kg/cm²) to prepare shaped samples. The physical characteristics of the samples were measured, and the results are shown in the following Table 10. The shapes each exhibited an excellent balance of physical properties and melt viscosity characteristics.

TABLE 10

| | No. of Examples | | | | | | | | |
|---|---|---|---|---|---|---|---|---|---|
| | 26 | 27 | 28 | 29 | 30 | 31 | 32 | 33 | 34 |
| [Composition of a melt blend] | | | | | | | | | |
| "Torlon 4203 L" (parts) | 50 | 50 | 55 | 45 | 45 | 45 | 50 | 55 | 55 |
| Melt viscosity modifiers (shown in Table 5) (parts) | 10 (E) | 10 (F) | 15 (B) | 15 (A) | 15 (C) | 15 (D) | 20 (E) | 5 (F) | 15 (A) |
| Fillers¹ (parts) | 40 (CP) | 40 (CP) | 30 (CP) | 40 (CaCO₃) | 40 (CaCO₃) | 40 (CaCO₃) | 30 (GF) | 40 (GF) | 30 (GF) |
| Melt viscosity (at 350° C.) (poise) | 350 × 10³ | 580 × 10³ | 440 × 10³ | 19 × 10³ | 25 × 10³ | 390 × 10³ | 75 × 10³ | 310 × 10³ | 11 × 10³ |
| [Physical properties of a shaped article] | | | | | | | | | |
| Flexural strength | 1,130 | 990 | 1,070 | 1,140 | 870 | 1,050 | 1,650 | 1,300 | 1,200 |

TABLE 10-continued

| | No. of Examples | | | | | | | |
|---|---|---|---|---|---|---|---|---|
| | 26 | 27 | 28 | 29 | 30 | 31 | 32 | 33 | 34 |
| (kg/cm$^2$) | | | | | | | | | |
| Flexural modulus (kg/cm$^2$) | 9.8 × 10$^4$ | 10.5 × 10$^4$ | 7.2 × 10$^4$ | 6.2 × 10$^4$ | 7.9 × 10$^4$ | 6.6 × 10$^4$ | 8.2 × 10$^4$ | 7.2 × 10$^4$ | 8.3 × 10$^4$ |
| Izod impact strength (kg cm/cm) | 9 | 11 | 9 | 7 | 7 | 11 | 23 | 19 | 12 |
| Heat deflection temperature (°C.) | 225 | 245 | 245 | 215 | 235 | 225 | 194 | 248 | 225 |
| Rockwell hardness (ASTM D-1525) | M83 | M85 | M85 | | | | | M115 | |
| Anti-steel kinetic$^2$ friction coefficient | 0.08 | 0.06 | 0.09 | | | | | | |
| Amount of abrasion$^3$ (mg/cm$^2$ hr) | 1.46 | 1.53 | 1.52 | | | | | | |

[1]Fillers: CP—Graphite fine powder
CaCO$_3$—Heavy calcium carbonate fine powder ("Super SS" manufactured by Maruo Calcium Co., Ltd. in Japan)
GF—Glass fiber treated with a silicone coupling agent (Chopped strand (3 mm length) manufactured by Asahi Fiber Glass Co., Ltd. in Japan)
[2]Anti-steel kinetic friction coefficient: V = 80 m/min, PV = 550 kg m/cm$^2$ min)
[3]Amount of abrasion: V = 80 m/min, PV = 550 kg m/cm$^2$ min

COMPARATIVE EXAMPLE 12

Sixty parts of polyamideimide resin ("Torlon 4203 L" manufactured by AMOCO) and 40 parts of graphite fine powder or heavy calcium carbonate fine powder were dry blended. Thereafter, the resultant dry blend was supplied to a 40 mm φ extruder equipped with a screw having a compression ratio of 2.0/1, and while varying the treating temperature within the range of 300°–380° C., the melt blendability of the dry blend was examined. At treating temperatures within the range of 300°–340° C., uniform melt blending did not occur. At treating temperatures within the range of 340°–380° C., a part of said blend was melt mixed, but the electrical load current acting on the rotary screw shaft (30 r.p.m.) exceeded more than 30 amperes (which is a permissible limited value of the extruder). At either of the above temperature levels, it was impossible to carry out extrusion of a uniform melt blend. At a treating temperature exceeding 380° C., thermal decomposition and foaming of the polyamideimide resin were observed and the resin deteriorated. Therefore, such temperature could not be adopted as a treating temperature.

As can be seen from the foregoing results, unless appropriate thermoplastic resins are added to the composition, it is difficult to produce polyamideimide material containing 40% graphite or calcium carbonate by melt blending techniques.

EXAMPLE 35

Thirty parts of fine anhydrous gypsum powder (average particle diameter 2.5μ), 60 parts of polyamideimide resin pellets ("Torlon 4203 L" manufactured by AMOCO) and 10 parts of PPS resin pellets were dry blended and were thereafter supplied to a brabender plast-graph extruder. While the blend was being melt kneaded in said extruder at a treating temperature of 360° C. and a screw r.p.m. of 20, it was extruded twice therethrough to obtain uniformly melt blended pellets. When the torque acting on the screw at a stationary state by the second kneading during this operation was measured, it was as low as 1,800 g m. Subsequently, the melt blended pellets above obtained were compression molded at a temperature of 350°–360° C. under a pressure of 10–100 kg/cm$^2$ to prepare a shaped sample. The physical characteristics of this sample were measured, and the results are shown in the following Table 11. The sample exhibited excellent mechanical and thermal characteristics.

TABLE 11

| Flexural strength | [kg/cm$^2$] | 1,200 |
|---|---|---|
| Flexural modulus | [kg/cm$^2$] | 6.5 × 10$^4$ |
| Izod impact strength | [kg cm/cm] | 8.5 |
| Vicat softening point | [0° C.] | 288 |
| Rochwell harness | | M 105 |

EXAMPLE 36

Forty parts of heavy calcium carbonate ("Super 2 S" manufactured by Maruo Calcium Co., Ltd. in Japan), 20 parts of an aromatic polysulfone resin ("Polyether-sulfone 200 P") represented by the formula:

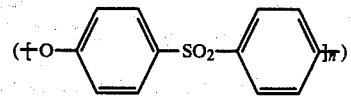

having a decomposition temperature of 451° C. and a melt viscosity of 12,000 poise, and 40 parts of a polyamideimide resin (the same as used in Example 35) were dry blended. Thereafter, the dry blended mixture was melt kneaded by the same operation as in Example 35 to obtain uniformly blended pellets. The extruder screw torque at a stationary state of the extrusion operation at the time of melt blending was 2,400 g m and stable. Subsequently, the above obtained component uniformly blended pellets were compression molded at a temperature of 350° C. under a pressure of 100 kg/cm$^2$ to prepare a shaped sample. The physical characteristics of this sample were measured, and were found excellent in thermal and mechanical properties as is shown in the following Table 12.

TABLE 12

| Flexural strength | [kg/cm$^2$] | 1,110 |
|---|---|---|
| Flexural modulus | [kg/cm$^2$] | 5.7 × 10$^4$ |
| Izod impact strength | [kg cm/cm] | 14.9 |
| Heat deflection temperature | [°C.] | 250 |

EXAMPLE 37

Forty parts of heavy calcium carbonate ("Super 2 S" manufactured by Maruo Calcium Co., Ltd., in Japan), 50 parts of polyamideimide resin powder ("Torlon 4000

T" manufactured by AMOCO), and 10 parts of polyhexamethylene isophthalamide/polyhexamethylene terephthalamide copolymer resin synthesized by melt polymerization having a melt viscosity of 880 poise and a decomposition temperature of 395° C. and represented by the formula:

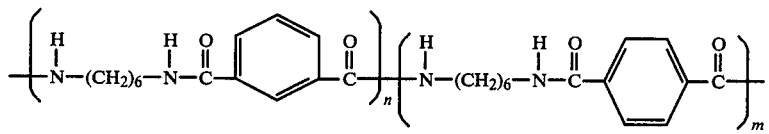

(n/m = 60/40 molar ratio)

were dry blended. Thereafter, the resulting dry blended mixture was melt kneaded by the same operation as in Example 35 to obtain uniformly blended pellets of "Torlon"/calcium carbonate/polyamide copolymer resin (50/40/10). The extruder screw torque at a stationary state of this operation at the time of melt blending was at a relatively low level of 1,700–1,800 g m and stable.

Next, the above obtained three component uniformly blended pellets were compression molded at a temperature of 350° C. under a pressure of 100 kg/cm² to prepare a shaped sample. The physical characteristics of this sample were measured, and were found excellent in mechanical and thermal properties as is shown in Table 13.

TABLE 13

| Flexural strength | [kg/cm²] | 2,280 |
|---|---|---|
| Flexural modulus | [kg/cm²] | 6.9 × 10⁴ |
| Izod impact strength | [kg cm/cm] | 12.7 |
| Heat deflection temperature | [°C.] | 219 |

EXAMPLE 38

Fifteen parts of an aromatic polyester resin represented by the formula:

having a melt viscosity of $3.1 \times 10^4$ poise and a decomposition temperature of 470° C., 30 parts of graphite fine powder, and 55 parts of an aromatic polyamideimide resin powder synthesized by a solution polymerization method in N-methyl pyrrolidone in the presence of phosphoric acid as a catalyst and represented by the formula

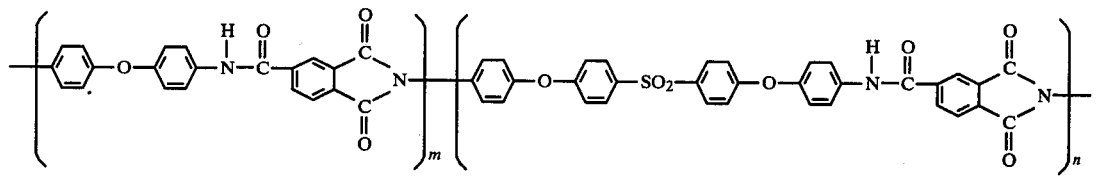

(m/n = 50/50 molar ratio)

having a logarithmic viscosity of 0.55 (polymer concentration: 0.5%, solvent: N-methyl pyrrolidone, measuring temperature: 30° C.) were dry blended. Thereafter, the thus obtained dry blended mixture was kneaded by the same method as in Example 35 to obtain uniformly melt blended pellets. Subsequently, the above obtained composition was compression molded at a temperature of 320° C. under the pressure of 80 kg/cm² to obtain a shaped article. The physical properties and melt viscosity were measured, and were found excellent in the balance of properties and melt viscosity characteristics as is shown in Table 14.

TABLE 14

| Melt viscosity | [poise] | 21 × 10³ |
|---|---|---|
| Flexural strength | [kg/cm²] | 930 |
| Flexural modulus | [kg/cm²] | 7.4 × 10⁴ |
| Izod impact strength | [kg cm/cm] | 8.8 |
| Heat deflection temperature | [°C. | 205 |

EXAMPLES 39 and 40

Fifty five parts of an aromatic polyamideimide synthesized by a solution polymerization method in N-methyl pyrrolidone in the presence of phosphoric acid as a catalyst and represented by the formula:

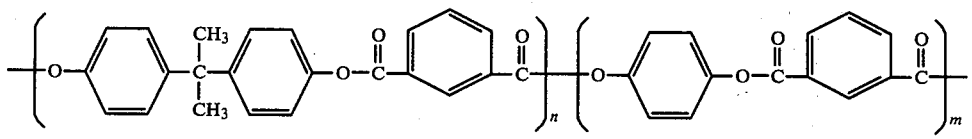

(n/m = 75/25 molar ratio)

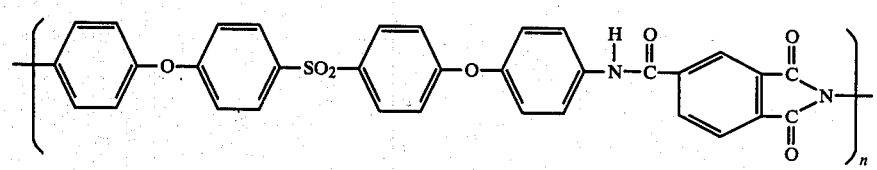

having a logarithmic viscosity of 0.55 (polymer concentration: 0.5%, solvent: N-methyl pyrrolidone, measuring temperature: 30° C.), 13 parts of 2,6-dimethylphenol/2,3,6-trimethylphenol (90/10 molar ratio) copolymerized polyphenylene-ether having an intrinsic viscosity of 0.45 (measured in chloroform at 25° C.), 2 parts of titanium oxide, 30 parts of graphite fine powder and 1 part of ethylene-tetrafluoride resin ("Afron-polymist F-5" manufactured by Asahi Glass Co., Ltd in Japan) were dry blended. Thereafter, the resulting dry blended mixture was kneaded by the same method as in Example 35 to obtain uniformly melt blended pellets having a melt viscosity as shown in Table 15.

Next, the above obtained composition were compression molded at a temperature of 340° C. under a pressure of 80 kg/cm² to obtain a shaped sample. The physical properties were measured, and are shown in the following Table 15. The sample exhibited an excellent balance of physical properties and melt viscosity characteristics (Example 39).

The same operation as in Example 39 above was repeated except that in lieu of utilizing 13 parts of phenoxy resin ("Phenoxy PKHH" manufactured by UCC in U.S.A.), 13 parts of the above described copolymerized polyphenylene-ether were used to obtain a shaped article having the physical properties as shown in Table 15 (Example 40).

TABLE 15

|  | Example 39 | Example 40 |
|---|---|---|
| Melt viscosity (at 350° C.) [poise] | 217 × 10³ | 12 × 10³ |
| Flexural strength [kg/cm²] | 1,035 | 1,070 |
| Flexural modulus [kg/cm²] | 5.8 × 10⁴ | 6.3 × 10⁴ |
| Izod impact strength [kg cm/cm] | 11.3 | 9 |
| Heat deflection temperature [°C.] | 211 | 218 |

We claim:

1. A heat resistant molding resin composition which comprises an aromatic polyamideimide resin having a repeating unit represented by the general formula:

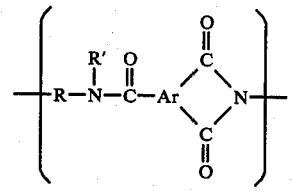

wherein Ar denotes a trivalent aromatic group containing at least one 6-member carbon ring, R denotes a divalent aromatic or aliphatic residue and R' denotes hydrogen, a methyl group or a phenyl group, as a main structural unit present in an amount of 60–99.9% by weight based on the entire weight of the resin composition and at least one thermoplastic resin consisting of a polyphenylene sulfide resin, said polyphenylenesulfide resin having a melt viscosity at 350° C. of not more than $1 \times 10^5$ poise and a decomposition temperature of not lower than 350° C., said polyphenylene sulfide resin being present in an amount of 40–0.1% by weight based on the entire weight of the resin composition.

2. A heat resistant molding resin composition as defined in claim 1, which comprises 70–99.9% by weight of said aromatic polyamideimide resin and 30–0.1% by weight of said thermoplastic resin.

3. A heat resistant molding resin composition as defined in claim 1, which comprises 80–99.9% by weight of said aromatic polyamideimide resin and 20–0.1% by weight of said thermoplastic resin.

4. A heat resistant molding resin composition as defined in claim 1, further containing not more than 250 parts by weight of filler materials based on 100 parts of the total amount of said aromatic polyamideimide resin and said thermoplastic resin.

* * * * *